US011539812B2

(12) United States Patent
Guo et al.

(10) Patent No.: US 11,539,812 B2
(45) Date of Patent: Dec. 27, 2022

(54) METHOD AND APPARATUS FOR GENERATING AND SUBSCRIBING TO NOTIFICATIONS

(71) Applicant: BOE TECHNOLOGY GROUP CO., LTD., Beijing (CN)

(72) Inventors: Zhenpeng Guo, Beijing (CN); Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 77 days.

(21) Appl. No.: 16/611,916

(22) PCT Filed: Nov. 14, 2017

(86) PCT No.: PCT/CN2017/110870
§ 371 (c)(1),
(2) Date: Nov. 8, 2019

(87) PCT Pub. No.: WO2018/205532
PCT Pub. Date: Nov. 15, 2018

(65) Prior Publication Data
US 2021/0152653 A1 May 20, 2021

(30) Foreign Application Priority Data
May 12, 2017 (CN) .......................... 201710336158.X

(51) Int. Cl.
*H04L 67/566* (2022.01)
*H04L 67/55* (2022.01)

(52) U.S. Cl.
CPC ............ *H04L 67/566* (2022.05); *H04L 67/55* (2022.05)

(58) Field of Classification Search
None
See application file for complete search history.

(56) References Cited

U.S. PATENT DOCUMENTS 5,532,938 A * 7/1996 Kondo .................. G06F 9/3885
708/524
9,307,038 B2 4/2016 Bekiares et al.
(Continued)

FOREIGN PATENT DOCUMENTS

CN 1859139 A 11/2006
CN 101821766 A 9/2010
(Continued)

OTHER PUBLICATIONS

International Search Report and Written Opinion dated Jan. 31, 2018 from State Intellectual Property Office of the P.R. China.
(Continued)

*Primary Examiner* — James A Edwards
(74) *Attorney, Agent, or Firm* — Dilworth & Barrese, LLP.; Michael J. Musella, Esq.

(57) ABSTRACT

Provided are a method and device for generating a notification and a method and device for subscribing a notification message. The method for generating a notification (300) includes: receiving a subscription request (S310); creating a first subscription resource according to the subscription request, the first subscription resource including a plurality of first event notification criteria and a second event notification criterion (S320); receiving a plurality of first events generated according to the plurality of first event notification criteria (S330); determining whether the plurality of first events satisfy the second event notification criterion (S340); and generating a notification in a case where the plurality of first events satisfies the second event notification criterion, the notification indicating a second event (S350).

16 Claims, 10 Drawing Sheets

(56) References Cited

U.S. PATENT DOCUMENTS

| | | |
|---|---|---|
| 9,553,940 B2 | 1/2017 | Oh et al. |
| 10,194,417 B2 * | 1/2019 | Jeong .................... H04W 4/70 |
| 2007/0153770 A1 | 7/2007 | Goyal et al. |
| 2008/0208953 A1 | 8/2008 | Tian |
| 2013/0207808 A1 * | 8/2013 | Lehmann .......... H04M 1/72403 340/600 |
| 2016/0192111 A1 * | 6/2016 | Choi ...................... H04L 67/26 455/507 |
| 2017/0353944 A1 * | 12/2017 | Kim .................... H04W 68/005 |
| 2020/0288291 A1 * | 9/2020 | Wang .................... H04L 67/12 |

FOREIGN PATENT DOCUMENTS

| | | |
|---|---|---|
| CN | 102687134 A | 9/2012 |
| CN | 103795758 B | 8/2015 |
| CN | 105578444 A | 5/2016 |
| CN | 106973118 A | 7/2017 |

OTHER PUBLICATIONS

Chinese Office Action dated Apr. 10, 2020.
ONEM2M Technical Specification TS-0001-V2.0.0, Functional Architecture, Aug. 30, 2016.

\* cited by examiner

METHOD AND APPARATUS FOR GENERATING AND SUBSCRIBING TO NOTIFICATIONS

TECHNICAL FIELD

The present disclosure relates to a method and apparatus for generating a notification and a method and apparatus for subscribing a notification message.

BACKGROUND

In the Internet of Things (IoT) system, mechanism of subscribing to a notification as far as an inventor(s) knows is realized by creating a <subscription> element under subscribed resources, and any change in attributes of the subscribed resources and any change in direct child resources would be likely to generate an event notification. However, the mechanism of subscribing a notification as far as the inventor(s) knows can subscribe and generate a notification only for a single event.

Therefore, it is needed a method and apparatus being capable of subscribing and generating a notification for multiple events.

SUMMARY

Embodiments of the present disclosure provide a method and apparatus for generating a notification and a method and apparatus for subscribing a notification message, which are capable of subscribing to and generating a notification for multiple events According to one aspect of embodiments of the present disclosure, provided is a method for generating a notification, the method comprising: receiving a subscription request; creating a first subscription resource according to the subscription request, the first subscription resource including a plurality of first event notification criteria and a second event notification criterion; receiving multiple first events generated in accordance with the plurality of first event notification criteria; determining whether the multiple first events satisfy the second event notification criterion; and generating a notification in a case where the multiple first events satisfy the second event notification criterion, wherein the notification indicates a second event.

In one example, before receiving multiple first events generated in accordance with the plurality of first event notification criteria, the method further comprises: creating at least one second subscription resource in accordance with the plurality of first event notification criteria.

In one example, the at least one second subscription resource belongs to one or more target resources.

In one example, the second event notification criterion indicates a relationship among the multiple first events.

In one example, the relationship includes an ordering relationship, a logical relationship or an arithmetic relationship of the multiple first events.

In one example, the ordering relationship indicates sequential occurrence or simultaneous occurrence of the multiple first events.

In one example, at least one of the plurality of first event notification criteria and the second event notification criterion is set in advance.

In one example, setting in advance at least one of the plurality of first event notification criteria and the second event notification criterion includes at least one of: storing in advance at least one of the plurality of first event notification criteria and the second event notification criterion; at least one of the plurality of first event notification criteria and the second event notification criterion being default; and searching at least one of the plurality of first event notification criteria and the second event notification criterion.

In one example, the subscription request includes at least one of the plurality of first event notification criteria and the second event notification criterion.

In one example, the subscription request includes a resource offset, which indicates a hierarchy of one or more target resources.

In one example, the subscription request further includes a list of target resources.

In one example, the subscription request further comprises a time window type and a time window size.

In one example, the generated multiple first events are further judged and analyzed in accordance with the second event notification criterion.

In one example, the method further comprises: creating three or more levels of subscription resources in accordance with multiple levels of event notification criteria.

According to one aspect of embodiments of the present disclosure, provided is an apparatus for generating a notification, comprising: an creating unit, configured to create a first subscription resource according to a subscription request, the first subscription resource including a plurality of first event notification criteria and a second event notification criterion; a receiving unit, configured to receive the subscription request and multiple first events generated in accordance with the plurality of first event notification criteria; a determining unit, configured to determine whether the multiple first events satisfy the second event notification criterion; and a generating unit, configured to generate a notification in a case where the multiple first events satisfy the second event notification criterion, wherein the notification indicates a second event.

In one example, the creating unit is further configured to: create at least one second subscription resource in accordance with the plurality of first event notification criteria.

In one example, the at least one second subscription resource belongs to one or more target resources.

In one example, the second event notification criterion indicates a relationship among the multiple first events.

In one example, the relationship includes an ordering relationship, a logical relationship or an arithmetic relationship of the multiple first events.

In one example, the ordering relationship indicates sequential occurrence or simultaneous occurrence of the multiple first events.

In one example, at least one of the plurality of first event notification criteria and the second event notification criterion is set in advance.

In one example, setting in advance at least one of the plurality of first event notification criteria and the second event notification criterion includes at least one of: storing in advance at least one of the plurality of first event notification criteria and the second event notification criterion; at least one of the plurality of first event notification criteria and the second event notification criterion being default; and searching at least one of the plurality of first event notification criteria and the second event notification criterion.

In one example, the subscription request includes at least one of the plurality of first event notification criteria and the second event notification criterion.

In one example, the subscription request includes a resource offset, which indicates a hierarchy of one or more target resources.

In one example, the subscription request further includes a list of target resources.

In one example, the subscription request further comprises a time window type and a time window size.

In one example, the determining unit is further configured to further judge and analyze the generated multiple first events in accordance with the second event notification criterion.

In one example, the creating unit is further configured to: create three or more levels of subscription resources in accordance with multiple levels of event notification criteria.

According to one aspect of embodiments of the present disclosure, provided is a method for subscribing to a notification, comprising: transmitting a subscription request; and receiving a notification in a case where multiple first events satisfy a second event notification criterion, wherein the notification indicates a second event, wherein the multiple first events are generated in accordance with a plurality of first event notification criteria.

In one example, the multiple first events belong to one or more target resources.

In one example, the second event notification criterion indicates a relationship among the multiple first events.

In one example, the relationship includes an ordering relationship, a logical relationship or an arithmetic relationship of the multiple first events.

In one example, the ordering relationship indicates sequential occurrence or simultaneous occurrence of the multiple first events.

In one example, at least one of the plurality of first event notification criteria and the second event notification criterion is set in advance.

In one example, setting in advance at least one of the plurality of first event notification criteria and the second event notification criterion includes at least one of: storing in advance at least one of the plurality of first event notification criteria and the second event notification criterion; at least one of the plurality of first event notification criteria and the second event notification criterion being default; and searching at least one of the plurality of first event notification criteria and the second event notification criterion.

In one example, the subscription request includes at least one of the plurality of first event notification criteria and the second event notification criterion.

In one example, the subscription request includes a resource offset, which indicates a hierarchy of one or more target resources.

In one example, the subscription request further includes a list of target resources.

In one example, the subscription request further comprises a time window type and a time window size.

In one example, the generated multiple first events are further judged and analyzed in accordance with the second event notification criterion.

In one example, the subscription request comprises three levels or more levels of event notification criteria.

According to one aspect of embodiments of the present disclosure, provided is an apparatus for subscribing to a notification, comprising: a transmitting unit, configured to transmit a subscription request; and a receiving unit, configured to receive a notification in a case where multiple first events satisfy a second event notification criterion, wherein the notification indicates a second event, wherein the multiple first events are generated in accordance with a plurality of first event notification criteria.

In one example, the multiple first events belong to one or more target resources.

In one example, the second event notification criterion indicates a relationship among the multiple first events.

In one example, the relationship includes an ordering relationship, a logical relationship or an arithmetic relationship of the multiple first events.

In one example, the ordering relationship indicates sequential occurrence or simultaneous occurrence of the multiple first events.

In one example, at least one of the plurality of first event notification criteria and the second event notification criterion is set in advance.

In one example, setting in advance at least one of the plurality of first event notification criteria and the second event notification criterion includes at least one of: storing in advance at least one of the plurality of first event notification criteria and the second event notification criterion; at least one of the plurality of first event notification criteria and the second event notification criterion being default; and searching at least one of the plurality of first event notification criteria and the second event notification criterion.

In one example, the subscription request includes at least one of the plurality of first event notification criteria and the second event notification criterion.

In one example, the subscription request includes a resource offset, which indicates a hierarchy of one or more target resources.

In one example, the subscription request further includes a list of target resources.

In one example, the subscription request further comprises a time window type and a time window size.

In one example, the generated multiple first events are further judged and analyzed in accordance with the second event notification criterion.

In one example, the subscription request comprises three levels or more levels of event notification criteria.

According to embodiments of the present disclosure, the multiple first events are generated in accordance with the plurality of first event notification criteria, and it is determined in accordance with the second event notification criterion whether a second event occurs. In a case where the second event occurs, the notification is generated. Thus, the generated notification indicates the second event, and the second event relates to the multiple first events that satisfy the second event notification criterion. Therefore, the multiple first events may be merged in one notification, so that data throughput is decreased, and load on the Internet is reduced.

Additionally, the generated multiple first events may be further judged and analyzed in accordance with the second event notification criterion, rather than the first event directly being notified of, thereby raising intelligence performance, and avoiding from the influence caused by information loss due to network failure.

BRIEF DESCRIPTION OF THE DRAWINGS

It would be easier to understand embodiments of the present disclosure based on following detailed description with reference to accompanying figures, of which a same reference mark designate a unit with a same structure, and of which.

DETAILED DESCRIPTION

Technical solutions in embodiments of the present disclosure will be described clearly and completely by combining with accompanying figures in the embodiments of the present disclosure. Obviously, the embodiments described below are just a part of embodiments of the present disclosure, instead of all the embodiments. Based on the embodiments in the present disclosure, all the other embodiments obtained by those ordinary skilled in the art without paying any inventive labor belong to the scope sought for protection in the present disclosure.

Figure 1:
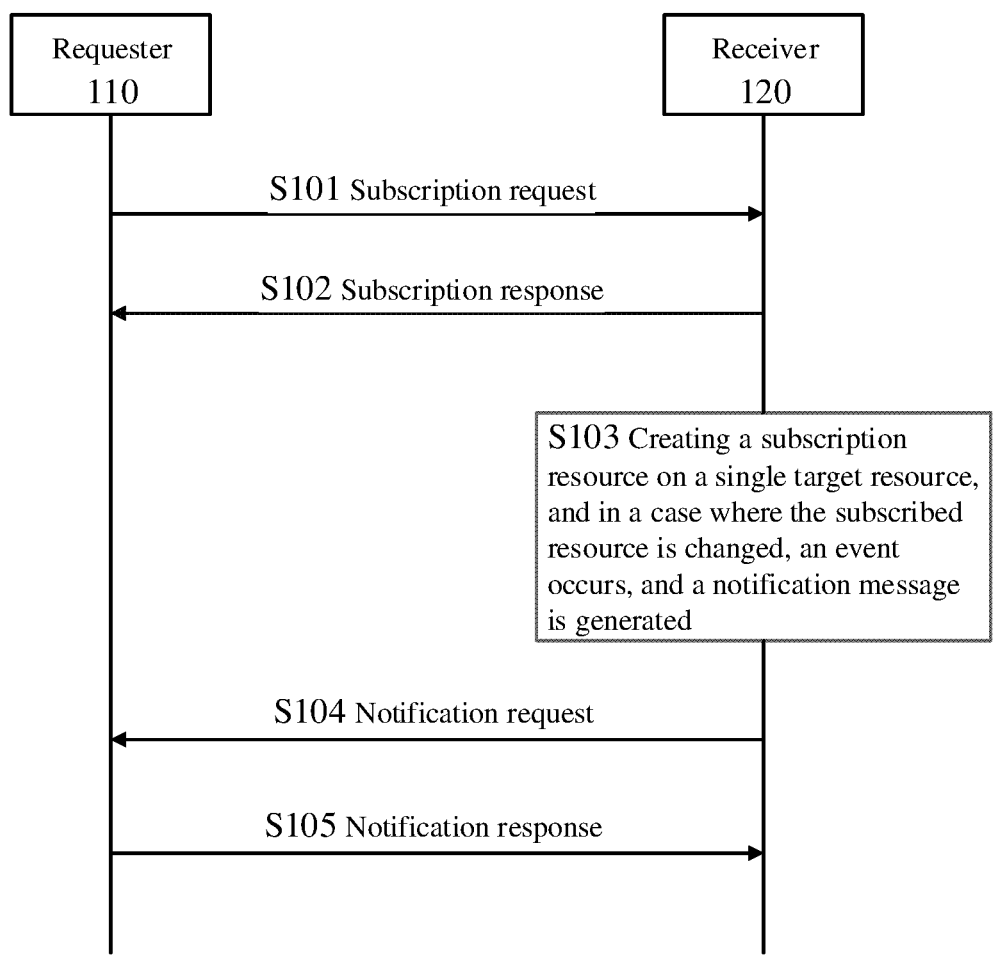
FIG. 1 shows a schematic signal flow diagram for subscribing to a message notification.

FIG. 1 shows a schematic signal flow diagram of subscribing to a message notification.

By referring to FIG. 1, a requester 110 transmits a subscription request to a receiver 120 in step S101. The receiver 120 transmits a subscription response to a requester 110 in step S102. Furthermore, in step S103, the receiver 120 creates a subscription resource <subscription> under a subscribed single target resource, and in a case where the subscribed resource is changed, it is determined that an event occurs, and a notification message is generated. In step S104, the receiver 120 transmits a notification request to the requester 110, and in step S105, the requester 110 transmits a notification response to the receiver 120. Thus, in a case where the subscribed target resource changes, the requester 110 receives the notification message.

Figure 2:
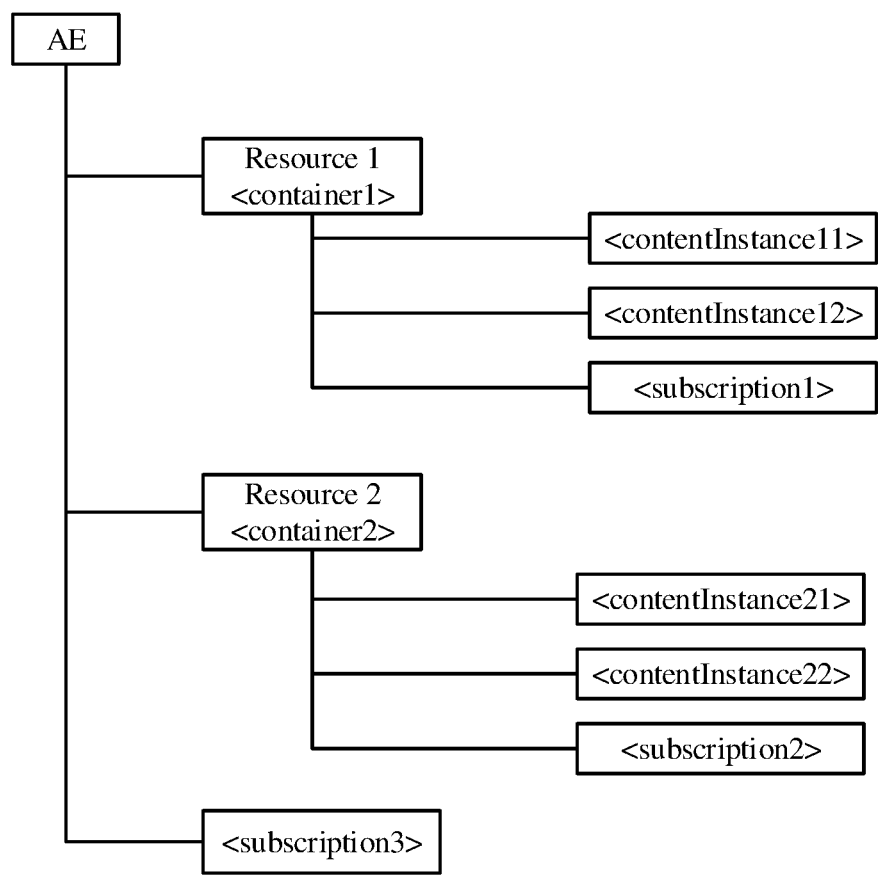
FIG. 2 shows a schematic view diagram of a subscription container.

FIG. 2 shows a schematic view diagram of a subscription container.

By referring to FIG. 2, a subscription resource <subscription1> is used to subscribe the change in attributes of a subscription resource 1 <container 1> and the change in its direct child resources, i.e., <contentInstance11> and <contentInstance12>, a subscription resource <subscription2> is used to subscribe the change in attributes of a subscription resource 2 <container 2> and the change in its direct child resources, i.e., <contentInstance21> and <contentInstance22>, a subscription resource <subscriptipn3> is used to subscribe the change in attributes of an application entity <AE> and the change in its direct child resources, i.e., <container1> and <container2>, but <subscription3> cannot subscribe the change in contents of <container1> and <container2>, that is, <subscription3> cannot subscribe the change in <contentInstance11>, <contentInstance12>, <contentInstance21> and <contentInstance22>.

As shown in FIGS. 1 and 2, subscription can be conducted only with respect to change in a single resource, so that the notification message only indicates occurrence of a single event. In a case where multiple events occur with respect to a single resource, it needs to generate and transmit a plurality of notifications. After receiving the plurality of notifications, a server analyzes them and determines meanings expressed by the plurality of notifications. Firstly, receipt of the plurality of notifications increases load on the Internet; secondly, a final analysis result is likely to be influenced due to loss of any notification message, so receipt of the plurality of notifications increases the requirement for the Internet; finally, analysis on the plurality of notifications also influences efficiency of the server.

Additionally, the mechanism as shown in FIG. 1 would not monitor a sequence event of a single resource or multiple resources and a combined event of multiple resources, either.

Figure 3:
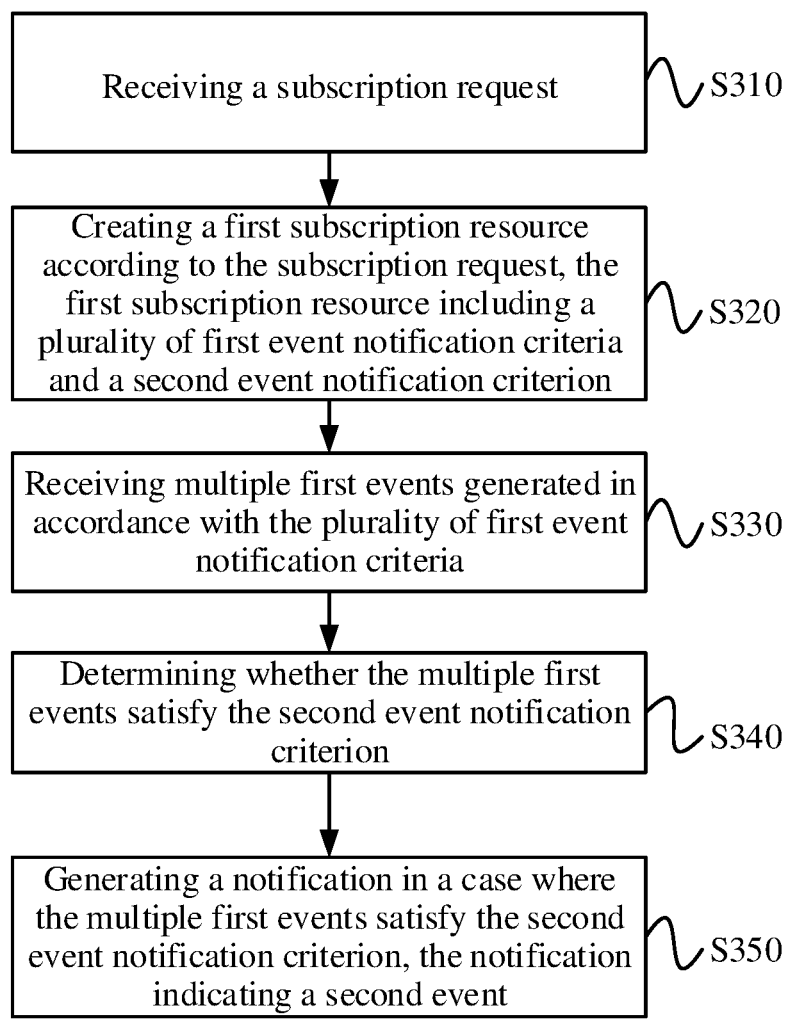
FIG. 3 shows a schematic flow diagram of a method for generating a notification according to an embodiment of the present disclosure.

FIG. 3 shows a schematic flow diagram of a method 300 for generating a notification according to an embodiment of the present disclosure. The method 300 may be executed at a platform side, for example a server, and so on.

As shown in FIG. 3, in step S310 of the method 300, a subscription request is received. In step S320, a first subscription resource is created according to the subscription request, the first subscription resource including a plurality of first event notification criteria and a second event notification criterion. In step S330, multiple first events generated in accordance with the plurality of first event notification criteria are received. In step S340, it is determined whether the multiple first events satisfy the second event notification criterion. In step S350, a notification is generated in a case where the multiple first events satisfy the second event notification criterion, the notification indicating a second event.

According to the embodiment of the present disclosure, the multiple first events are generated in accordance with the plurality of first event notification criteria, and it is determined in accordance with the second event notification criterion whether a second event occurs. In a case where the second event occurs, the notification is generated. Thus, the generated notification indicates the second event, and the second event relates to the multiple first events that satisfy the second event notification criterion. Therefore, the multiple first events may be merged in one notification, so that data throughput is decreased, and load on the Internet is reduced.

Additionally, the generated multiple first events may be further judged and analyzed in accordance with the second event notification criterion, rather than the first event directly being notified of, thereby raising intelligence performance, and avoiding from the influence caused by information loss due to network failure.

In one example, before receiving the multiple first events generated in accordance with the plurality of first event notification criteria, the method 300 may further comprise: creating at least one second subscription resource in accordance with the plurality of first event notification criteria. Herein, the plurality of first event notification criteria may be in a list form. The number of the first event notification criteria may be 2 or more, for example, {eventNotificationCriteria1, eventNotificationCriteria2, . . . eventNotificationCrirerian}, where n is an integer greater than or equal to 2. According to {eventNotificationCriteria1, eventNotificationCriteria2, . . . eventNotificationCriterian}, multiple first events, i.e., FirstEvent1, FirstEvent2, . . . FirstEventn, may be generated correspondingly.

According to the embodiment of the present disclosure, the first subscription resource is created under a parent resource of the target resource, for example <AE> resource, and at least one second subscription resource is created under the target resource.

In one example, the at least one second subscription resource may belong to one or more target resources. In a case where the second subscription resource belongs to one target resource, the first subscription resource may be <subscription>; and in a case where the second subscription resource belongs to a plurality of target resources, the first subscription resource may be <crossResourceSubscirption>.

Of course, more levels of subscription resources may be created under more target resources according to the requirements, for example, a third subscription resource, a fourth subscription resource, . . . , a N-th subscription resource may be created for hierarchical target resources, where N is an integer greater than or equal to 2. However, the embodiment of the present disclosure is not limited thereto.

In one example, the second event notification criterion may indicate a relationship among the multiple first events. The relationship may include an ordering relationship, a logical relationship or an arithmetic relationship among the multiple first events. Therefore, the second event notification criterion can be set flexibly, so as to realize sequence subscription, combination subscription, etc., for the multiple first events.

For example, the ordering relationship may indicate sequential occurrence or simultaneous occurrence of the multiple first events. That is to say, the ordering relationship indicates that the multiple first events could occur in succession in a predetermined time sequence, or indicates that the multiple first events could occur simultaneously or basically simultaneously, for example, it is possible that a predetermined time margin exists, and in a case where the multiple first events occur during the predetermined time margin, it could be considered that the multiple first events occur simultaneously. However, the embodiment of the present disclosure is not limited thereto.

The logical relationship may include for example relationships such as AND, OR, or XOR among the multiple first events. However, the embodiment of the present disclosure is not limited thereto.

The arithmetic relationship may include for example relationships between a result of an arithmetic operation (such as adding, subtracting, multiplying, dividing, and modeling, etc.) performed on event values of the multiple first events and a predetermined threshold, for example, greater than, equal to, smaller than, greater than or equal to, smaller than or equal to, and so on and so forth. However, the embodiment of the present disclosure is not limited thereto.

For example, as for the ordering relationship, the second event notification criterion may indicate that FirstEvent2 occurs after FirstEvent1, or indicate that FirstEvent1 and FirstEvent2 occur simultaneously; as for the logical relationship, the second event notification criterion may indicate that FirstEvent2 does not occur while FirstEvent1 occurs, and FirstEvent2 occurs while FirstEvent1 does not occur; or as for the arithmetic relationship, the second event notification criterion may indicate that a value of FirstEvent1*a value of FirstEvent2>($\geq$, $<$, $\leq$, $\neq$, $=$, etc.) a predetermined threshold.

The number of the second event notification criterion may also be 2 or more than 2.

Additionally, as required, more levels of event notification criteria may also exist. For example, in a case where N levels of subscription resources are created, correspondingly, N levels of event notification criteria may exist, for example, a plurality of first event notification criteria, a plurality of second event notification criteria, . . . , a N-th event notification criterion (one or more).

In one example, at least one of the plurality of first event notification criteria and second event notification criterion is set in advance. For example, at least one of the plurality of first event notification criteria and second event notification criterion may be stored in advance at the platform side. Alternatively, in a case where a predetermined target resource is directed at, at least one of the plurality of first event notification criteria and the second event notification criterion may be default at the platform side, or may be searched voluntarily at the platform side.

In one example, the subscription request may include at least one of the plurality of first event notification criteria and the second event notification criterion.

In one example, the subscription request may comprise a resource offset "offset", which denotes a hierarchy of one or more target resources. Therefore, user may focus on not only the child resource of the target resource but also its grandchild resource, and child resource of the grandchild resource, and so on. For example, when offset=0, it denotes subscription of changes in the target resource and its child resource; when offset=1, it denotes subscription of changes in the target resource and its child resource and grandchild resource. Additionally, the offset may also be set so that it denotes subscription of changes in the child resource and grandchild resource of the target resource. Of course, the value of offset herein is just for illustration. Those skilled in the art can set the offset as a value in other formats as required, and designate more hierarchies of resources to be concerned. A value of offset may be set for each target resource respectively, or one value of offset may be set for all target resources. As described above, when changes in the target resource and its child resource and grandchild resource are subscribed, a plurality of first event notification criteria specific to the grandchild resource, a plurality of second event notification criteria specific to the child resource, and a third event notification criterion specific to the target resource may exist.

In one example, the subscription request may include a list listOfResource of the target resource, to designate the target resource.

In one example, the subscription request may include a time window type timeWindowType. For example, when timeWindowType=1, it denotes that the time window is a periodic time window; and when timeWindowType=0, it denotes that the time window is a sliding time window. Within the range of the sliding time window, if an identical first event is generated, then a new event takes the place of an old event. Within the range of the periodic time window, an update message is transmitted as long as an event is generated. Of course, the embodiment of the present disclosure is not limited thereto, and other types of time windows may also be designated.

In one example, the subscription request may include a time window size timeWindowSize, and its value may be binary system, decimal system, hexadecimal system, etc. The unit of the time window size may be second for example.

Optionally, offset, listOfResource, timeWindowType and timeWindowSize may be not included in the subscription request, but be a default value.

The platform side may create a first subscription resource based on the subscription request. Table 1 below shows attributes that the first subscription resource is likely to have. The first subscription resource is for example <subscription> or <crossResourceSubscirption>.

TABLE 1

| Attributes of the first subscription resource | Value/ type | Readability/ writability (R/W) | Description |
|---|---|---|---|
| FirstEventNotificationCriteria | List | RW | First event notification criteria, which may be in a list form and are readable and writable. For example, {eventNotificationCriteria1, eventNotificationCriteria2, . . . eventNotificationCrirerian }, where n is an integer greater than or equal to 2. |
| SecondEventNotificationCriteria | | RW | Second event notification criterion, which indicates a relationship among multiple first events and is readable and writable. For example, a value of FirstEvent1 * a value of FirstEvent2 > a predetermined threshold. |
| listOfResource | | RW | A resource list, which indicates target resources to be concerned and is readable and writable. |
| timeWindowType | 0 or 1 | RW | Time window type, which is readable and writable. For example, timeWindowType=1 denotes a periodic time window, timeWindowType=0 denotes a sliding time window. |
| timeWindowSize | | RW | The time window size, whose unit is second, and which is readable and writable. |
| offset | | RW | Resource offset, which denotes a hierarchy of a target resource concerned. For example, when offset=0, it denotes subscription of changes in the target resource and its child resource; when offset=1, it denotes subscription of changes in the child resource and grandchild resource of the target resource. |

Specific embodiments according to the present disclosure will be described below by referring to the figures.

According to a first embodiment of the present disclosure, a single target resource is subscribed and a notification is generated, to monitor a change in a sequence of multiple events of the single resource. According to a second embodiment of the present disclosure, a plurality of target resources, for example, group resources, are subscribed, and a notification is generated, to monitor a change in a sequence of multiple events of the plurality of resources. According to a third embodiment of the present disclosure, a plurality of target resources, for example, non-group resources, are subscribed, and a notification is generated, to monitor a change in combination of multiple events of the plurality of resources. According to a fourth embodiment of the present disclosure, a plurality of target resources, for example, non-group resources, are subscribed, and a notification is generated, to monitor a change in a sequence of multiple events of the plurality of resources.

Figure 4:
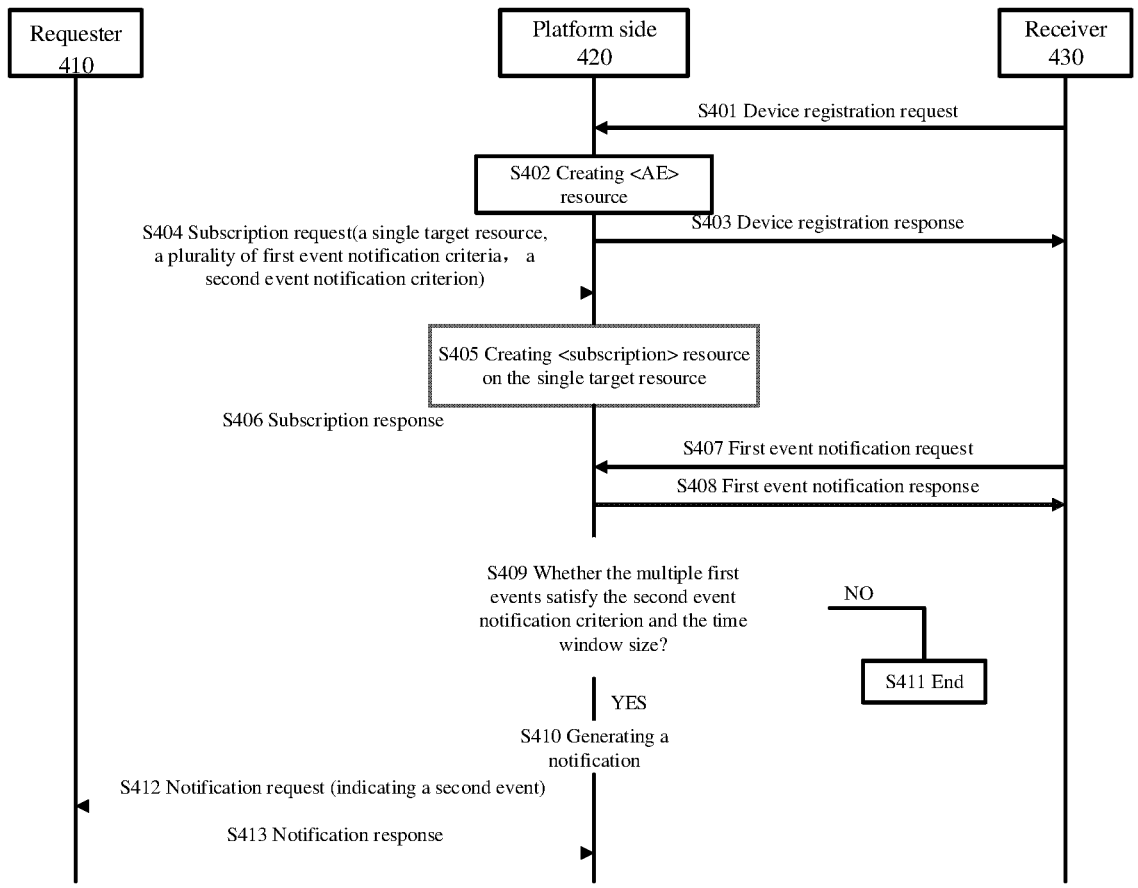
FIG. 4 shows a schematic signal flow diagram of generating a notification according to a first embodiment of the present disclosure.

FIG. 4 shows a schematic signal flow diagram of generating a notification according to a first embodiment of the present disclosure, in which a single target resource is subscribed, and a notification is generated.

As shown in FIG. 4, in step S401, a receiver 430 transmits a device registration request to a platform side 420. In step S402, the platform side creates an <AE> resource. In step S403, the platform side 420 transmits a device registration response to the receiver 430.

In step S404, the requester 410 transmits a subscription request to the platform 420. The subscription request may include a single target resource, a plurality of first event notification criteria, and a second event notification criterion. Optionally, the subscription request may further comprise a time window type, a time window size, and a resource offset, etc. Although the subscription request transmitted by the requester 410 includes a plurality of first event notification criteria and a second event notification criterion in the present embodiment, the platform side 420 may obtain at least one of the plurality of first event notification criteria and the second event notification criterion in other ways. For example, as mentioned above, at least one of the plurality of first event notification criteria and the second event notification criterion may be stored in advance at the platform side 420, or the platform side 420 has obtained at least one of the plurality of first event notification criteria and the second event notification criterion in the previous procedure.

In step S405, the platform side 410 creates a first subscription resource (i.e., <subscription> resource) on the single target resource. The <subscription> resource includes the plurality of first event notification criteria and the second event notification criterion, and the <subscription> resource optionally may include time window type, time window size, resource offset, and so on and so forth. In step S406, the platform side 420 returns a subscription response to the requester 410.

After that, in a case where a first event is generated in accordance with the plurality of first event notification criteria at the receiver 430, in step S407, the receiver 430 transmits a first event notification request to the platform side 420, and in step S408, the platform side 420 returns a first event notification response to the receiver 430.

Steps S407 and S408 may be repeated, to receive multiple first events.

In step S409, the platform side 420 determines whether the multiple first events satisfy the second event notification criterion, and optionally further determines whether the multiple first events fall within the range of the time window size. If the multiple first events satisfy the second event notification criterion (and optionally fall within the range of time window size), then in step S410, the platform side 420 generates a notification; otherwise, in step S411, this procedure ends up. Optionally, after the step S411, another time window may be started up immediately, to continue monitoring.

In step S412, the platform side 420 transmits a notification request to the requester 410, and this notification request indicates a second event, in particular, indicates that the multiple first events occurring within the range of the time window size satisfy the second event notification criterion.

In step S413, the requester 410 returns a notification response.

Figure 5:
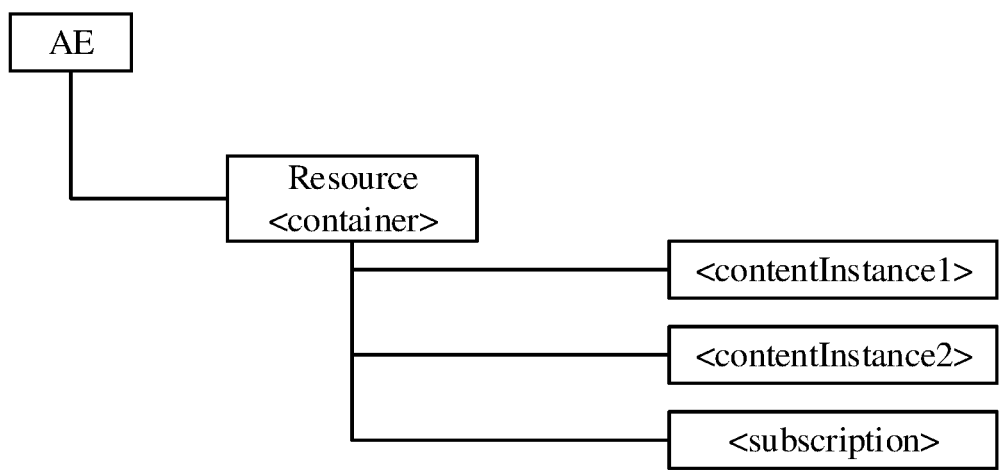
FIG. 5 shows a schematic view diagram of a subscription container according to a first embodiment of the present disclosure.

FIG. 5 shows a schematic view diagram of a subscription container according to the first embodiment of the present disclosure.

In one example, the requester 410 may be a management application, the platform side 420 may be an industrial platform, and the receiver 430 may be an industrial device.

Figure 6:
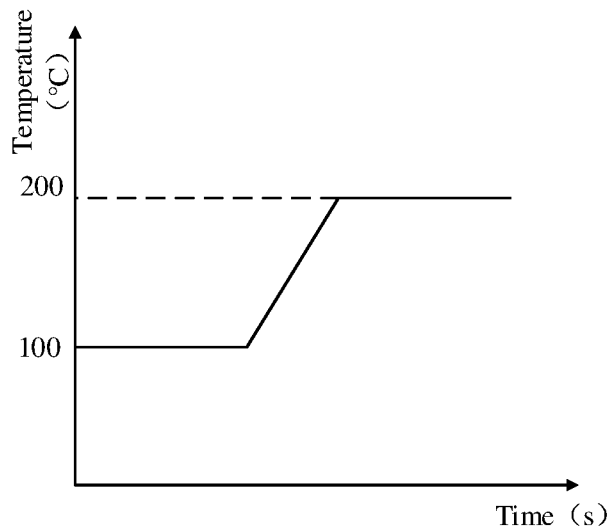
FIG. 6 shows a schematic diagram of detecting a graded variation in temperature to generate a notification according to a first embodiment of the present disclosure.

In particular, the first event notification criteria may indicate a first event notification criterion 1, i.e., eventNotificationCriteria1, as temperature>100° C., and a first event notification criterion 2, i.e., eventNotificationCriteria2, as temperature>200° C., which may be expressed as {temperature>100° C.; temperature>200° C.} in a list form, then FirstEvent1 denotes an event where temperature>100° C. occurs, and FirstEvent2 denotes an event temperature>200° C. occurs. The second event notification criterion indicates that FirstEvent2 occurs after FirstEvent1, and the time window type timeWindowType=1 (it denotes the periodic time window), and the time window size timeWindowSize=20 s. In a case where the management application receives a notification, the second event may represent that the temperature of the industrial device further rises above 200° C. after being greater than 100° C. within 20 s, so that a graded variation in the temperature of the industrial device may be monitored, as shown in FIG. 6.

In the first embodiment, because it is directed at a single resource, only the first subscription resource <subscription> is created while the second subscription resource is omitted, as shown in FIG. 5. However, as well, the first subscription resource <subscription> may be created under the <AE> resource, and the second subscription resource is then created under a corresponding resource, for example, <subscription1>.

According to the embodiment of the present disclosure, a notification may be generated for a change in sequence of multiple events of a single resource.

Figure 7:
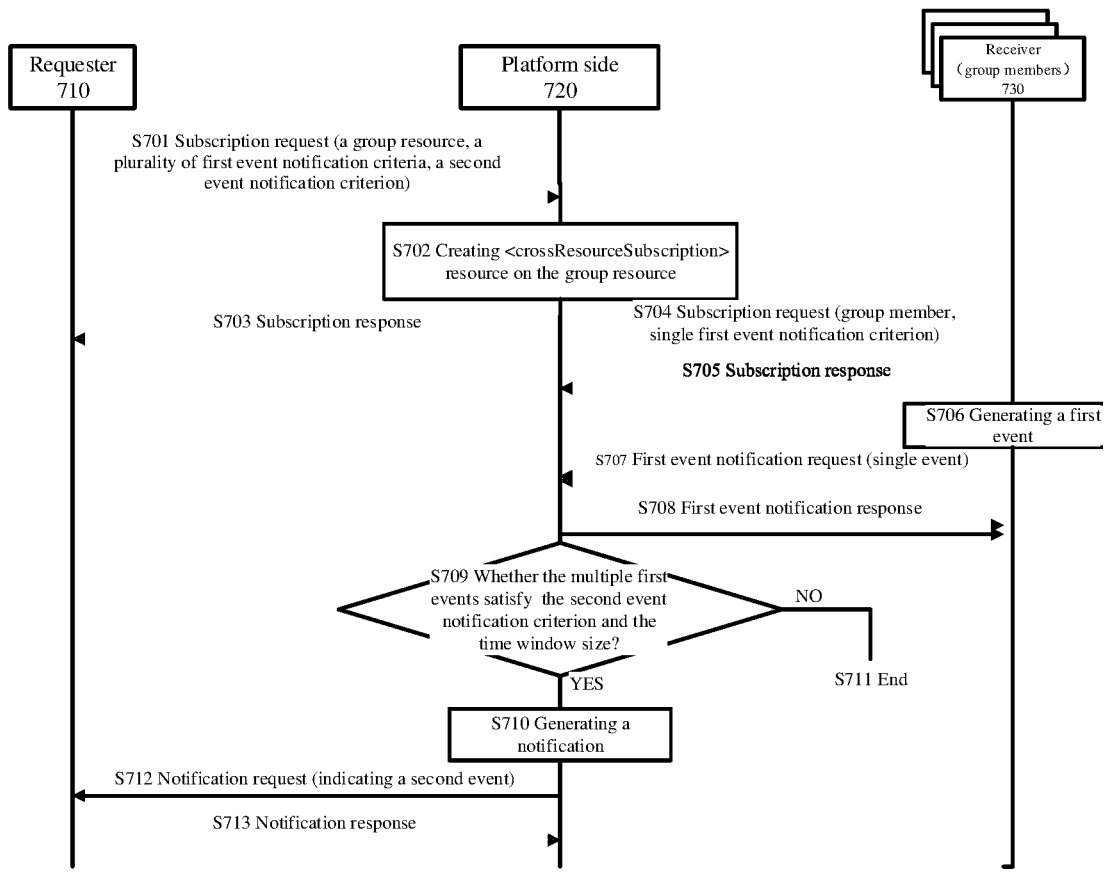
FIG. 7 shows a schematic signal flow diagram of generating a notification according to a second embodiment of the present disclosure.

FIG. 7 shows a schematic signal flow diagram of generating a notification according to a second embodiment of the present disclosure, in which a notification is subscribed and generated with respect to a plurality of target resources, for example, group resources, to monitor a change in sequence of multiple events of the plurality of resources. In the second embodiment, multiple receivers 730 are group members.

As shown in FIG. 7, in the step S701, a requester 710 transmits a subscription request to a platform side 720. The subscription request may include a group resource, a plurality of first event notification criteria and a second event notification criterion, and optically may further include time window type, time window size, resource offset, etc. As described above, although the subscription request transmitted at the requester 710 includes the plurality of first event notification criteria and the second event notification criterion in the present embodiment, the platform side 720 may obtain at least one of the plurality of first event notification criteria and the second event notification criterion in other ways. For example, as described above, at least one of the plurality of first event notification criteria and the second event notification criterion may be stored in advance at the platform side 720, or the platform side 710 has obtained at least one of the plurality of first event notification criteria and the second event notification criterion in the previous procedure.

In step S702, the platform side 720 creates a first subscription resource (i.e., <crossResourceSubscirption> resource) on the group resource, the <crossResourceSubscirption> resource includes the plurality of first event notification criteria and the second event notification criterion, and optionally may further include time window type, time window size, resource offset etc. In step S703, the platform side 720 returns a subscription response to the requester 710.

In step S704, the platform side 720 transmits a subscription request to each of the multiple receivers 730. Each subscription request includes a corresponding single first event notification criterion, time window type, time window size, resource offset, etc. In step S705, each receiver 730 returns a subscription response to the platform side 720.

After that, in step S706, the first event is generated at each receiver 730 in accordance with the corresponding first event notification criterion. In step S707, the receiver 730 transmits a first event notification request to the platform side 720, to notify a single first event, and furthermore, in step S708, the platform side 420 returns a first event notification response to the corresponding receiver 730.

Steps S706 to S708 may be repeated for multiple times, to receive the occurred first event with respect to each receiver 730. S707 and S708 are shown by double-headed arrows in FIG. 7, to indicate that the steps S707 and S708 may be repeated for multiple times.

In step S709, the platform side 720 determines whether the multiple first events satisfy the second event notification criterion, and optionally further determines whether the multiple first events fall within the range of time window size. If the multiple first events satisfy the second event notification criterion (and optionally fall within the range of time window size), then in step S710, the platform side 720 generates a notification; otherwise, in step S711, this procedure ends up. Optionally, after the step S711, another time window may be started up immediately, to continue monitoring.

In step S712, the platform side 720 transmits a notification request to the requester 710, and this notification request indicates a second event, in particular, indicates that the multiple first events occurring within the range of the time window size satisfy the second event notification criterion.

In step S713, the requester 710 returns a notification response.

Figure 8:
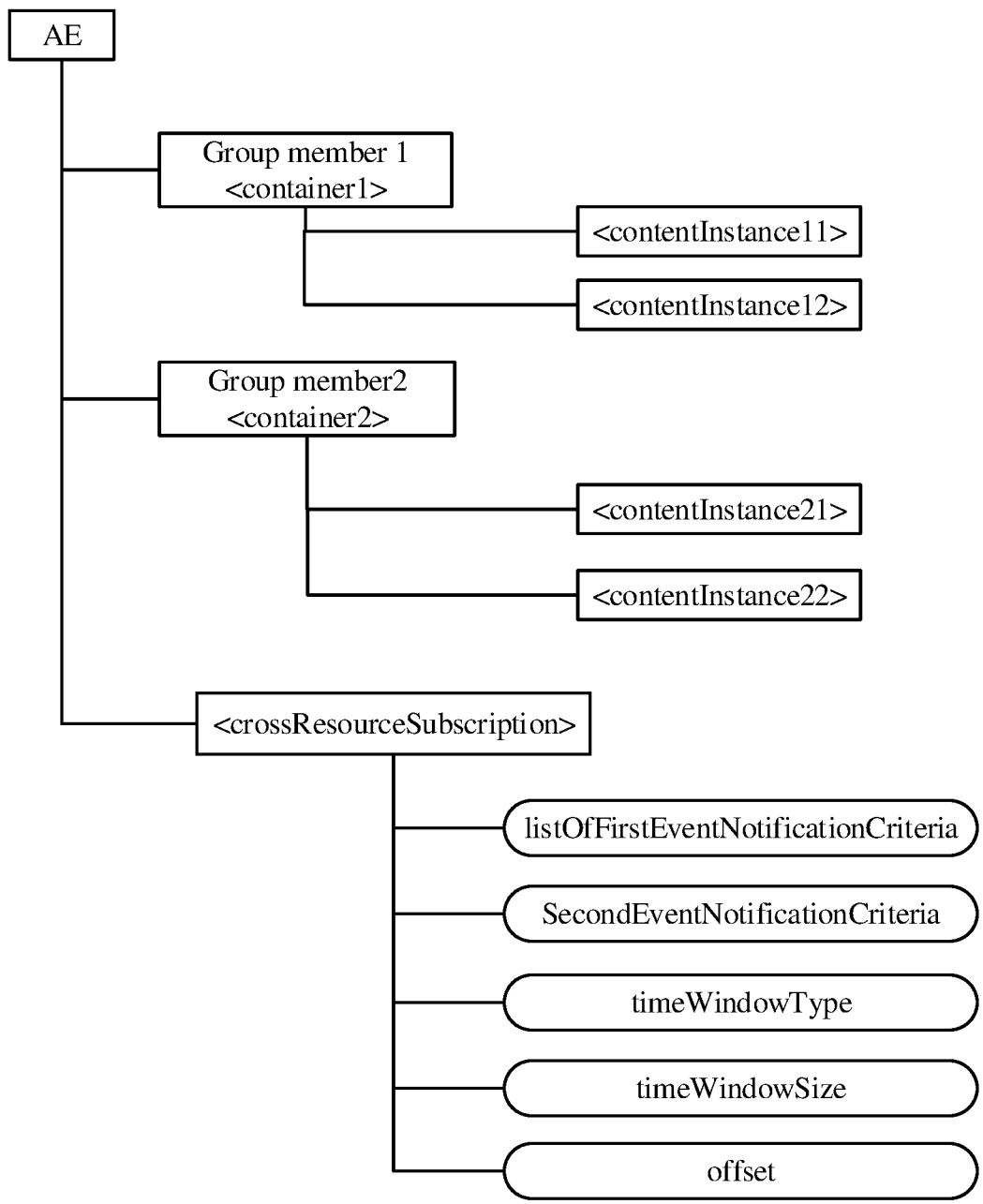
FIG. 8 shows a schematic view diagram of a subscription container according to a second embodiment of the present disclosure.

FIG. 8 shows a schematic view diagram of a subscription container according to the second embodiment of the present disclosure.

In one example, the requester 710 may be a management application, the platform side 720 may be an industrial platform, for example, group hosting common service entity (CSE), and the receiver 730 may be an industrial device group that serves as group members. In the embodiment, because the platform side 720 is CSE and subscribes resources of the group members, processes of device registration requesting, device registration responding and <AE> creating may be omitted.

In particular, according to the second embodiment, a first event of a first member may be FirstEvent1, a first event of a second member may be FirstEvent2, . . . , a first event of an n-th member may be FirstEventn. The second event notification criterion may prescribe that each first event occurs in a sequence of FirstEvent1, FirstEvent2, . . . , FirstEventn. In a case where the multiple first events satisfy the second event notification criterion and fall within the range of time window size, the platform side 720 generates a notification and transmits the notification to the requester 710, to indicate the second event. Then, the second event denotes to the requester 710 that the multiple first events occur according to the sequence of FirstEvent1, FirstEvent2, . . . , FirstEventn within the range of time window size.

Therefore, according to the embodiment of the present disclosure, the notification may be generated for the occurring sequence of the multiple first events of the plurality of target resources (group resources).

For example, in the case of industrial application, it may be detected whether industrial devices on an assembly line have received product information in sequence.

In particular, the plurality of first event notification criteria may be denoted as {a first member has received product information, a second member has received product information, . . . , a n-th member has received product information}. Then, FirstEvent1 indicates an event of a first member having received product information occurs, and FirstEvent2 indicates an event of a second member having received product information occurs, and so on and so forth, FirstEventn indicates an event of an n-th member having received product information. Thus, in a case where the requester 710 receives a notification, the second event may indicate that each member has received product information according to the sequence of the first member, the second member, . . . , the n-th member.

Figure 9:
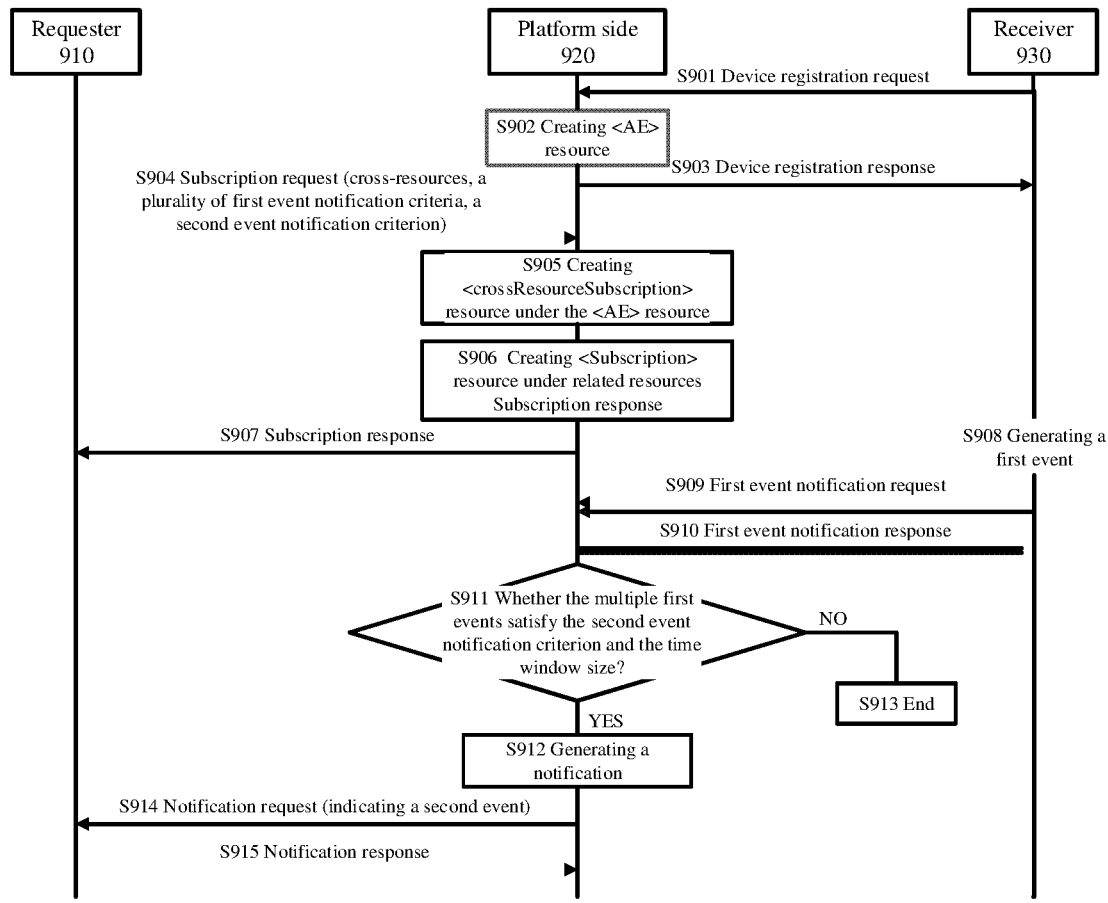
FIG. 9 shows a schematic signal flow diagram of generating a notification according to a third embodiment of the present disclosure.

FIG. 9 shows a schematic signal flow diagram of generating a notification according to a third embodiment of the present disclosure, in which a notification is subscribed and generated with respect to a plurality of target resources, for example, non-group resources, to monitor a change in combination of multiple events of a plurality of resources. In the third embodiment, a plurality of resources do not belong to one group.

As shown in FIG. 9, in step S901, the receiver 930 transmits a device registration request to a platform side 920. In step S902, the platform side creates an <AE> resource. In step S903, the platform side 920 transmits a device registration response to the receiver 930.

In step S904, the requester 910 transmits a subscription request to the platform side 920. The subscription request may comprise a plurality of first event notification criteria and a second event notification criterion, and optionally may further include a plurality of resources of cross-resources (resource list), time window type, time window size, resource offset, etc. As described above, although the subscription request transmitted by the requester 910 includes a plurality of first event notification criteria and the second event notification criterion in the embodiment, the platform side 920 may obtain at least one of the plurality of first event notification criteria and the second event notification criterion in other ways. For example, as described above, at least one of the plurality of first event notification criteria and the second event notification criterion in other ways may be stored in advance at the platform side 920, or the platform side 920 has obtained at least one of the plurality of first event notification criteria and the second event notification criterion in the previous procedure.

In step S905, the platform side 920 creates a first subscription resource on the <AE> resource, i.e., <crossResourceSubscirption> resource. The <crossResourceSubscirption> resource includes the plurality of first event notification criteria and the second event notification criterion, and the <crossResourceSubscirption> resource optionally may further include a resource list, time window type, time window size, and resource offset, etc.

In step S906, the platform side 920 creates a second subscription resource (<subscription> resource) under related resources in accordance with the resource list. Each <subscription> resource includes a corresponding first event notification criterion. Each <subscription> resource may also include time window type, time window size, resource offset, etc.

In step S907, the platform side 920 returns a subscription response to the requester 910.

After that, in step S908, the receiver 930 generates a first event in accordance with the corresponding first event notification criterion. In step S909, the receiver 930 transmits a first event notification request to the platform side 920, to notify a single first event, and in step S910, the platform side 920 returns a first event notification response to the receiver 930.

Steps S908 to S910 may be repeated for multiple times, so as to receive the occurred first event with respect to each resource of the receiver 930. S909 and S910 are shown by a double-headed arrow in FIG. 9, to denote that steps S909 and S910 may be repeated for multiple times.

In step S911, the platform side 920 determines whether the multiple first events satisfy the second event notification criterion, and optionally further determines whether the multiple first events fall within the range of time window size. If the multiple first events satisfy the second event notification criterion (and optionally fall within the range of time window size), then in step S912, the platform 920 generates a notification; otherwise, in step S913, this procedure ends up. Optionally, after step S913, another time window may be started up immediately, to continue monitoring.

In step S914, the platform side 920 transmits a notification request to the requester 910, and this notification request indicates the second event, in particular, indicates that the multiple first events occurring within the range of time window size satisfy the second event notification criterion.

In step S915, the requester 910 returns a notification response.

Figure 10:
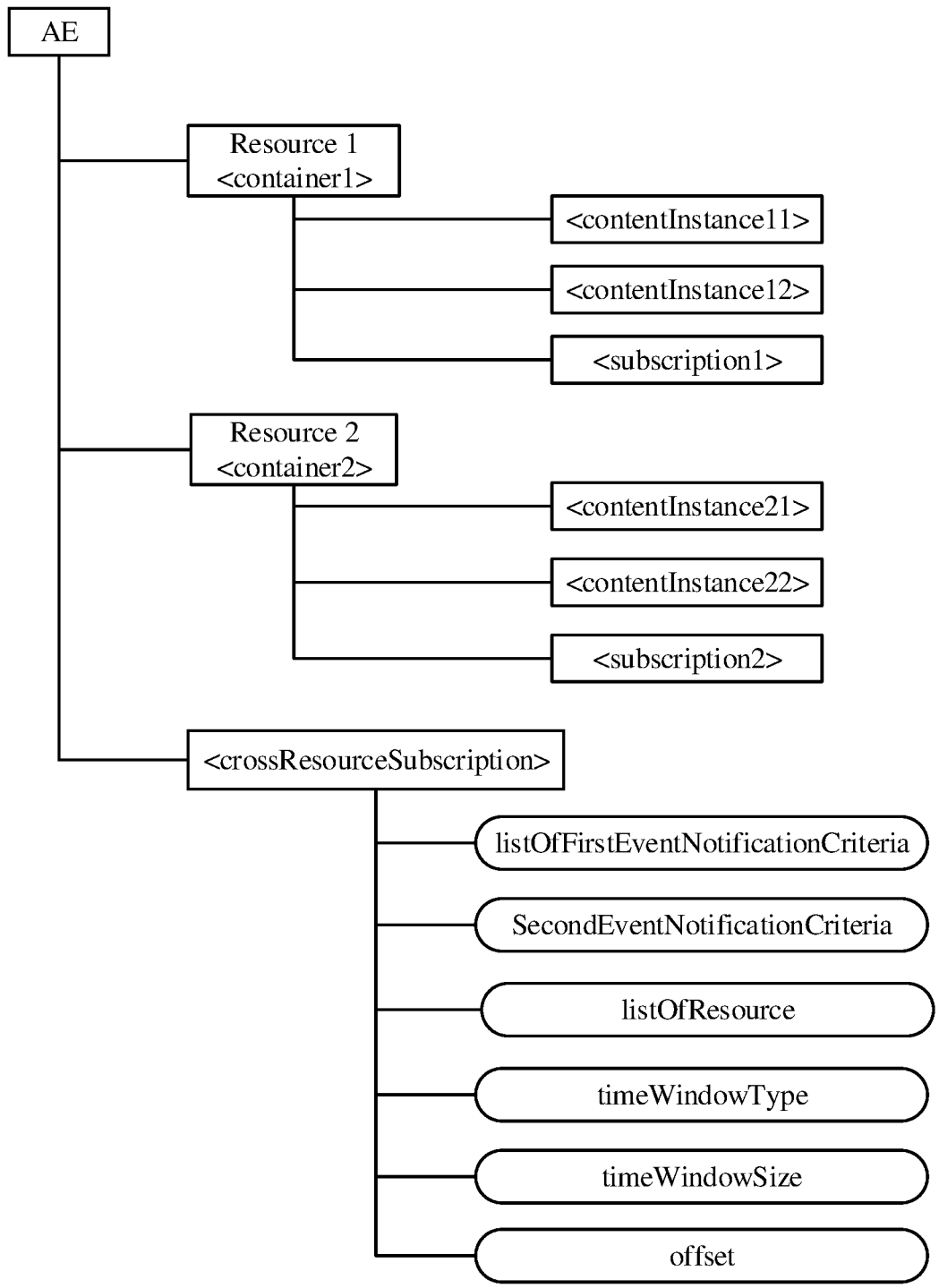
FIG. 10 shows a schematic view diagram of a subscription container according to a third embodiment of the present disclosure.

FIG. 10 shows a schematic view diagram of a subscription container according to the third embodiment of the present disclosure.

In one example, the requester 910 may be a management application, the platform side 920 may be an industrial platform, and the receiver 930 may be an industrial device.

In particular, the first event notification criteria may indicate a first event notification criterion 1, i.e., eventNotificationCriteria1, as temperature>500° C., and indicate a first event notification criterion 2, i.e., eventNotificationCriteria2, as pressure>400 pa, which may be denoted as {temperature>500° C.; pressure>400 pa} in a list form, then FirstEvent1 denotes an event where temperature>500° C. occurs, and FirstEvent2 denotes an event where temperature>400 pa occurs. The second event notification criterion may indicate that a value of FirstEvent1*a value of FirstEvent2>2000, i.e., temperature of the industrial device*pressure of the industrial device>2000, and the time window type timeWindowType=1 (it indicates the periodic time window), and the time window size timeWindowSize=20 s. In a case where the management application receives a notification, the second event may denotes that the temperature of the industrial device*pressure of the industrial device within 20 s is greater than 2000, that is, the temperature of the industrial device and pressure of the industrial device are higher than their corresponding predetermined values simultaneously during the period of time, so that abnormal change of the industrial device may be monitored.

Therefore, according to the embodiment of the present disclosure, a notification may be generated for occurrence of combination of the multiple first events of the plurality of target resources.

Additionally, the signal flow diagram and the schematic view diagram of the subscription container according to a fourth embodiment of the present disclosure are similar to FIGS. 9 and 10 according to the third embodiment, and thus no further details are given herein. The difference is that, according to the fourth embodiment of the present disclosure, a notification is subscribed and generated with respect to the plurality of target resources, for example, non-group resources, to monitor a change in sequence of multiple events of the plurality of resources.

In particular, the first event notification criteria may indicate a first event notification criterion 1, i.e., eventNotificationCriteria1, as temperature>500° C., and a first event notification criterion 2, i.e., eventNotificationCriteria2, as pressure>400 pa, which may be denoted as {temperature>500° C.; pressure>400 pa} in a list form, then FirstEvent1 denotes an event where temperature>500° C. occurs, and FirstEvent2 denotes an event where temperature>400 pa occurs. The second event notification criterion may indicate that FirstEvent2 occurs after occurrence of FirstEvent1, and the time window type timeWindowType=1 (it indicates the periodic time window), and the time window size timeWindowSize=20 s. In a case where the management application receives a notification, the second event may denote that within 20 s, after the temperature of the industrial device>500° C., its pressure>400 pa, so that a change in sequence of the temperature and pressure of the industrial device may be monitored.

Therefore, according to the embodiment of the present disclosure, a notification may be generated for sequential occurrence of the multiple first events of the plurality of target resources.

Although the first to fourth embodiments according to the present disclosure are described in the context of industrial application, the present disclosure may also be applied in household environment, for example, a notification may be subscribed and generated with respect to devices such as an air cleaner, a temperature sensor or the like.

Additionally, as another example of household application, a certain behavior (i.e., second event) may be monitored and controlled by monitoring a sequence event of a single resource or a plurality of resources. For example, the requester subscribes a sequence event of two lamps (for example, a lamp 1 outside the door is turned on, and a lamp 2 inside the door is turned on), and by receiving the sequence event of the two lamps, it may be determined whether the user is getting in or going out; in a case where a notification message of "turn-on" of the lamp 2 inside the door is received after a notification message of "turn-on" of the lamp 1 outside the door is received, it can be determined the user is getting in, and otherwise, it can be determined the user is getting out.

Of course, those skilled in the art shall understand that the present disclosure is not limited thereto.

Figure 11:
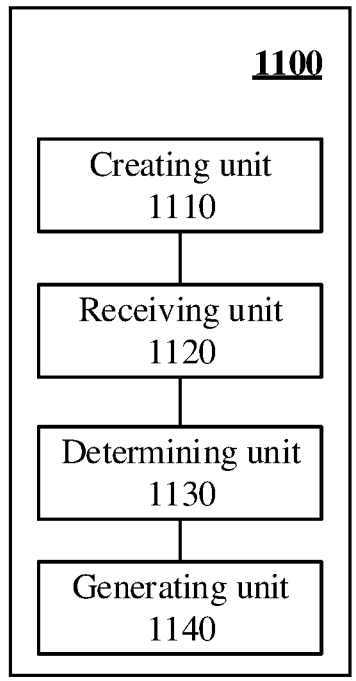
FIG. 11 shows a schematic block diagram of an apparatus for generating a notification according to an embodiment of the present disclosure.

FIG. 11 shows a schematic block diagram of an apparatus 1100 for generating a notification according to an embodiment of the present disclosure.

As shown in FIG. 11, the apparatus 1100 may comprise a creating unit 1110, a receiving unit 1120, a determining unit 1130 and a generating unit 1140.

The creating unit 1110 may create a first subscription resource according to a subscription request, and the first subscription resource includes a plurality of first event notification criteria and a second event notification criterion. The receiving unit 1120 may receive the subscription request and multiple first events generated in accordance with the plurality of first event notification criteria. The determining unit 1130 may determine whether the multiple first events satisfy the second event notification criterion. The generating unit 1140 may generate a notification in a case where the multiple first events satisfy the second event notification criterion, and the notification indicates a second event.

According to the embodiment of the present disclosure, the multiple first events are generated in accordance with the plurality of first event notification criteria, and it is determined whether the second event occurs in accordance with the second event notification criterion. In a case where the second event occurs, the notification is generated. Thus, the generated notification indicates the second event, and the second event relates to the multiple events that satisfy the second event notification criterion. Therefore, the multiple first events may be merged in one notification, so that data throughput is decreased, and load on the Internet is reduced.

Additionally, the generated multiple first events may be further judged and analyzed in accordance with the second event notification criterion, rather than the first event being notified of directly, thereby raising intelligence performance, and avoiding from the influence caused by information loss due to network failure.

In one example, the creating unit 1110 may further create at least one second subscription resource in accordance with the plurality of first event notification criteria. Herein, the plurality of first event notification criteria may be in a list form. The number of the first event notification criteria may be 2 or more than 2. For example, {eventNotificationCriteria1, eventNotificationCriteria2, . . . eventNotificationCririerian}, where n is an integer greater than or equal to 2. According to {eventNotificationCriteria1, eventNotificationCriteria2, . . . eventNotificationCriterian}, multiple first events, i.e., FirstEvent1, FirstEvent2, . . . FirstEventn, may be generated correspondingly.

According to the embodiment of the present disclosure, the first subscription resource is created under a parent resource of the target resource, for example <AE> resource, and at least one second subscription resource is created under the target resource.

In one example, at least one second subscription resource may belong to one or more target resources. In a case where the second subscription resource belongs to one target resource, the first subscription resource may be <subscription>; in a case where the second subscription resource belongs to a plurality of target resources, the first subscription resource may be <crossResourceSubscirption>.

Of course, more levels of subscription resources may be created under more target resources according to the requirements, for example, a third subscription resource, a fourth subscription resource, . . . , a N-th subscription resource may be created for hierarchical target resources, where N is an integer greater than or equal to 2. However, the embodiment of the present disclosure is not limited thereto.

In one example, the second event notification criterion may indicate a relationship among multiple first events. The relationship may include an ordering relationship, a logical relationship or an arithmetic relationship among the multiple first events. Therefore, the second event notification criterion can be set flexibly, so as to realize sequence subscription, combination subscription of the multiple first events. Examples of the ordering relationship, the logical relationship or the arithmetic relationship have been described above, and thus no further details are given here.

For example, as for the ordering relationship, the second event notification criterion may indicate that FirstEvent2 occurs after FirstEvent1, or indicate that FirstEvent1 and FirstEvent2 occur simultaneously; as for the logical relationship, the second event notification criterion may indicate that FirstEvent2 does not occur while FirstEvent1 occurs, and FirstEvent2 occurs while FirstEvent1 does not occur; or as for the arithmetic relationship, the second event notification criterion may indicate that a value of FirstEvent1*a value of FirstEvent2>($\geq$, >, $\leq$, $\neq$, =, etc.) a predetermined threshold.

The number of the second event notification criterion may also be 2 or more than 2.

Additionally, as required, more levels of event notification criteria may also exist. For example, in a case where N levels of subscription resources are created, correspondingly, N levels of event notification criteria may exist, for example, a plurality of first event notification criteria, a plurality of second event notification criteria, . . . , a N-th event notification criterion (one or more).

In one example, at least one of the plurality of first event notification criteria and the second event notification criterion is set in advance. For example, at least one of the plurality of first event notification criteria and the second event notification criterion may be stored in advance at the platform side. Alternatively, in a case where a predetermined target resource is directed at, at least one of a plurality of first event notification criteria and the second event notification criterion may be default at the platform side, or may be searched voluntarily at the platform side.

In one example, the subscription request may include at least one of the plurality of first event notification criteria and the second event notification criterion.

In one example, the subscription request may comprise a resource offset "offset" that indicates a hierarchy of one or more target resources. Therefore, user may focus on not only the child resource of the target resource but also its grandchild resource, and child resource of the grandchild resource, and so on and so forth. For example, when offset=0, it denotes subscription of changes in the target resource and its child resource; when offset=1, it denotes subscription of changes in the target resource and its child resource and grandchild resource. Additionally, the offset may also be set so that it denotes subscription of changes in the child resource and grandchild resource of the target resource. Of course, the value of offset herein is just for illustration. Those skilled in the art can set it as a value in other formats as required, and designate more levels of resources to be concerned. A value of offset may be set for each target resource respectively, or one value of offset is set for all target resources. As described above, in a case where changes in the target resource and its child resource and grandchild resource are subscribed, a plurality of first event notification criteria specific to the grandchild resource, a plurality of second event notification criteria specific to the child resource, and a third event notification criterion specific to the target resource may exist.

In one example, the subscription request may include a list listOfResource of the target resource, to designate the target resource.

In one example, the subscription request may include a time window type timeWindowType. For example, when timeWindowType=1, it denotes that the time window is a periodic time window; and when timeWindowType=0, it denotes that the time window is a sliding time window. Within the range of the sliding time window, if an identical first event is generated, then a new event takes the place of an old event. Within the range of the periodic time window, an update message is transmitted as long as an event is generated. Of course, the embodiment of the present disclosure is not limited thereto, and other types of time windows may also be designated.

In one example, the subscription request may include a time window size timeWindowSize, and its value may be binary system, decimal system, hexadecimal system, etc. The unit of the time window size may be second for example.

Optionally, offset, listOfResource, timeWindowType and timeWindowSize may not be included in the subscription request, but be a default value.

Figure 12:
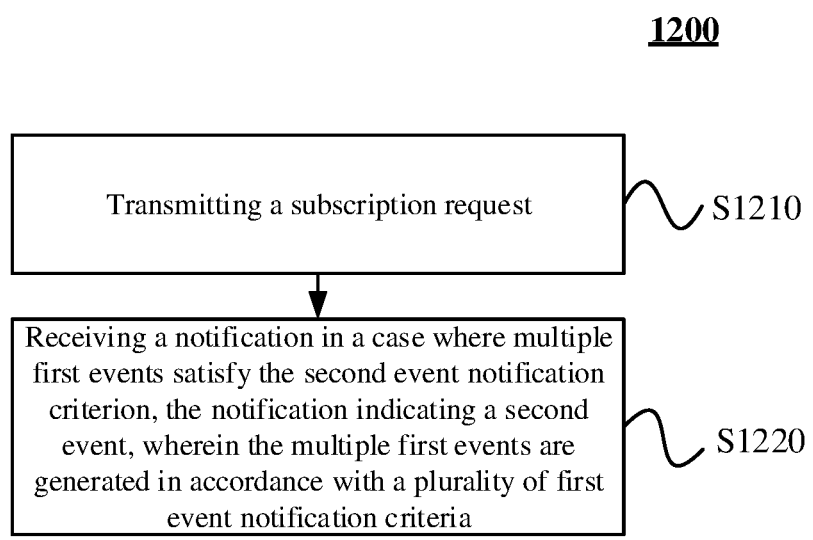
FIG. 12 shows a schematic flow diagram of a method for subscribing to a notification according to an embodiment of the present disclosure.

FIG. 12 shows a schematic flow diagram of a method 1200 for subscribing to a notification according to an embodiment of the present disclosure. The method 1200 may be executed at a user side or at a management device side. As shown in FIG. 12, in step S1210 of the method 1200, a subscription request is transmitted. In step S1220, a notification is received in a case where the multiple first events satisfy the second event notification criterion, in which the notification indicates a second event. Herein, the multiple first events are generated in accordance with a plurality of first event notification criteria.

According to the embodiment of the present disclosure, the multiple first events are generated in accordance with the plurality of first event notification criteria, and it is determined whether a second event occurs in accordance with the second event notification criterion. In a case where the second event occurs, the notification is generated. Thus, the generated notification indicates the second event, and the second event relates to the multiple events that satisfy the second event notification criterion. Therefore, the multiple first events may be merged in one notification, so that data throughput is decreased, and load on the Internet is reduced.

Additionally, the generated multiple first events may be further judged and analyzed in accordance with the second event notification criterion, rather than the first event being notified of directly, thereby raising intelligence performance, and avoiding from the influence caused by information loss due to network failure.

In one example, the multiple first events belongs to one or more target resources.

In one example, the second event notification criterion may indicate a relationship among multiple first events. The relationship may include an ordering relationship, a logical relationship or an arithmetic relationship among the multiple first events. Therefore, the second event notification criterion can be set flexibly, so as to realize sequence subscription, combination subscription of the multiple first events. Examples of the ordering relationship, the logical relationship or the arithmetic relationship have been described above, and thus no further details are given here.

For example, as for the ordering relationship, the second event notification criterion may indicate that FirstEvent2 occurs after FirstEvent1, or indicate that FirstEvent1 and FirstEvent2 occur simultaneously; as for the logical relationship, the second event notification criterion may indicate that FirstEvent2 does not occur while FirstEvent1 occurs, and FirstEvent2 occurs while FirstEvent1 does not occur; or as for the arithmetic relationship, the second event notification criterion may indicate that a value of FirstEvent1*a value of FirstEvent2>($\geqslant$, $<$, $\leqslant$, $\neq$, $=$, etc.) a predetermined threshold.

In one example, at least one of the plurality of first event notification criteria and the second event notification criterion is set in advance. For example, at least one of the plurality of first event notification criteria and the second event notification criterion may be stored in advance at the platform side. Alternatively, in a case where a predetermined target resource is directed at, at least one of a plurality of first event notification criteria and the second event notification criterion may be default at the platform side, or may be searched voluntarily at the platform side.

In one example, the subscription request may comprise a resource offset "offset", which denotes a hierarchy of one or more target resources. Therefore, user may focus on not only the child resource of the target resource but also its grandchild resource and child resource of the grandchild resource, and so on and so forth. For example, when offset=0, it denotes subscription of changes in the target resource and its child resource; when offset=1, it denotes subscription of changes in the target resource and its child resource and grandchild resource. Additionally, the offset may also be set so that it denotes subscription of changes in the child resource and grandchild resource of the target resource. Of course, the value of offset herein is just for illustration. Those skilled in the art can set it as a value in other formats as required, and designate more levels of resources to be concerned. A value of offset may be set for each target resource respectively, or one value of offset is set for all target resources. As described above, in a case where changes in the target resource and its child resource and grandchild resource are subscribed, a plurality of first event notification criteria specific to the grandchild resource, a plurality of second event notification criteria specific to the child resource, and a third event notification criterion specific to the target resource may exist.

In one example, the subscription request may include a list listOfResource of the target resource, to designate the target resource.

In one example, the subscription request may include a time window type timeWindowType. For example, when timeWindowType=1, it denotes that the time window is a periodic time window; and when timeWindowType=0, it denotes that the time window is a sliding time window. Within the range of the sliding time window, if an identical first event is generated, then a new event takes the place of an old event. Within the range of the periodic time window, an update message is transmitted as long as an event is generated. Of course, the embodiment of the present disclosure is not limited thereto, and other types of time windows may be designated.

In one example, the subscription request may include a time window size timeWindowSize, and its value may be binary system, decimal system, hexadecimal system, etc. The unit of the time window size may be second for example.

In one example, the subscription request may include at least one of the plurality of first event notification criteria and the second event notification criterion. Herein, the plurality of first event notification criteria may be in a list form. The number of the first event notification criteria may be 2 or more than 2, for example, {eventNotificationCriteria1, eventNotificationCriteria2, . . . eventNotificationCrirerian}, where n is an integer greater than or equal to 2. According to {eventNotificationCriteria1, eventNotificationCriteria2, . . . eventNotificationCriterian}, multiple first events, i.e., FirstEvent1, FirstEvent2, FirstEventn, may be generated correspondingly.

The number of the second event notification criterion may also be 2 or more than 2.

Additionally, as required, more levels of event notification criteria may also exist. For example, in a case where N levels of subscription resources are created, correspondingly, N levels of event notification criteria may exist, for example, a plurality of first event notification criteria, a plurality of second event notification criteria, . . . , a N-th event notification criterion (one or more).

Optionally, offset, listOfResource, timeWindowType and timeWindowSize may not be included in the subscription request, but may be a default value.

Figure 13:
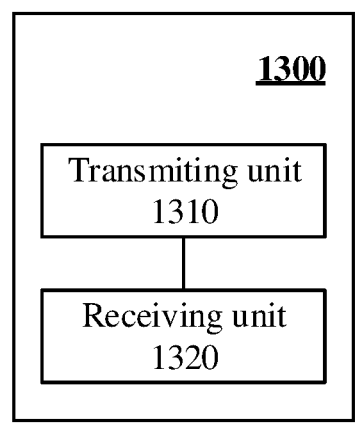
FIG. 13 shows a schematic block diagram of an apparatus for subscribing to a notification according to an embodiment of the present disclosure.

FIG. 13 shows a schematic block diagram of an apparatus 1300 for subscribing to a notification according to an embodiment of the present disclosure.

As shown in FIG. 13, the apparatus 1300 may include a transmitting unit 1310 and a receiving unit 1320.

The transmitting unit 1310 may transmit a subscription request, and the receiving unit 1320 may receive a notification in a case where multiple first events satisfy the second event notification criterion, and the notification indicates the second event, in which the multiple first events are generated in accordance with the plurality of first event notification criteria.

According to the embodiment of the present disclosure, the multiple first events are generated in accordance with the plurality of first event notification criteria, and it is determined whether the second event occurs according to the second event notification criterion. In a case where the second event occurs, the notification is generated. Thus, the generated notification indicates the second event, and the second event relates to the multiple events that satisfy the second event notification criterion. Therefore, the multiple first events may be merged in one notification, so that data throughput is decreased, and load on the Internet is reduced.

Additionally, the multiple generated first events may be further judged and analyzed in accordance with the second event notification criterion, rather than the first event being notified of directly, thereby raising intelligence performance, and avoiding from the influence caused by information loss due to network failure.

In one example, the multiple first events belongs to one or more target resources.

In one example, the second event notification criterion may indicate a relationship among multiple first events. The relationship may include an ordering relationship, a logical relationship or an arithmetic relationship among the multiple first events. Therefore, the second event notification criterion can be set flexibly, so as to realize sequence subscription, combination subscription of the multiple first events. Examples of the ordering relationship, the logical relationship or the arithmetic relationship have been described above, and thus no further details are given here.

For example, as for the ordering relationship, the second event notification criterion may indicate that FirstEvent2 occurs after FirstEvent1, or indicate that FirstEvent1 and FirstEvent2 occur simultaneously; as for the logical relationship, the second event notification criterion may indicate that FirstEvent2 does not occur while FirstEvent1 occurs, and FirstEvent2 occurs while FirstEvent1 does not occur; or as for the arithmetic relationship, the second event notification criterion may indicate that a value of FirstEvent1*a value of FirstEvent2>($\geq$, <, $\leq$, $\neq$, =, etc.) a predetermined threshold.

In one example, at least one of the plurality of first event notification criteria and the second event notification criterion is set in advance. For example, at least one of the plurality of first event notification criteria and the second event notification criterion may be stored in advance at the platform side. Alternatively, in a case where a predetermined target resource is being directed at, at least one of a plurality of first event notification criteria and the second event notification criterion may be default at the platform side, or may be searched voluntarily at the platform side.

In one example, the subscription request may comprise a resource offset "offset" that indicates a hierarchy of one or more target resources. Therefore, user may focus on not only the child resource of the target resource but also its grandchild resource, the child resource of the grandchild resource, and so on and so forth. For example, when offset=0, it denotes subscription of changes in the target resource and its child resource; when offset=1, it denotes subscription of changes in the target resource and its child resource and grandchild resource. Additionally, the offset may also be set so that it denotes subscription of changes in the child resource and grandchild resource of the target resource. Of course, the value of offset herein is just for illustration. Those skilled in the art can set it as a value in other formats as required, and designate more levels of resources to be concerned. A value of offset may be set for each target resource respectively, or one value of offset is set for all target resources. As described above, when changes in the target resource and its child resource and grandchild resource are subscribed, a plurality of first event notification criteria specific to the grandchild resource, a plurality of second event notification criteria specific to the child resource, and a third event notification criterion specific to the target resource may exist.

In one example, the subscription request may include a list listOfResource of the target resource, to designate the target resource.

In one example, the subscription request may include a time window type timeWindowType. For example, when timeWindowType=1, it denotes that the time window is a periodic time window; and when timeWindowType=0, it denotes that the time window is a sliding time window. Within the range of the sliding time window, if an identical first event is generated, then a new event takes the place of an old event. Within the range of the periodic time window, an update message is transmitted as long as an event is generated. Of course, the embodiment of the present disclosure is not limited thereto, and other types of time windows may be designated.

In one example, the subscription request may include a time window size timeWindowSize, and its value may be binary system, decimal system, hexadecimal system, etc. The unit of the time window size may be second for example.

In one example, the subscription request may include at least one of the plurality of first event notification criteria and the second event notification criterion. Herein, the plurality of first event notification criteria may be in a list form. The number of the first event notification criteria may be 2 or more than 2, for example, {eventNotificationCriteria1, eventNotificationCriteria2, . . . eventNotificationCririerian}, where n is an integer greater than or equal to 2. According to {eventNotificationCriteria1, eventNotificationCriteria2, . . . eventNotificationCriterian}, multiple first events, i.e., FirstEvent1, FirstEvent2, FirstEventn, may be generated correspondingly.

The number of the second event notification criterion may also be 2 or more than 2.

Additionally, as required, more levels of event notification criteria may also exist. For example, in a case where N levels of subscription resources are created, correspondingly, N levels of event notification criteria may exist, for example, a plurality of first event notification criteria, a plurality of second event notification criteria, . . . , a N-th event notification criterion (one or more).

Optionally, offset, listOfResource, timeWindowType and timeWindowSize may not be included in the subscription request, but may be a default value.

Additionally, respective functional units in respective embodiments of the present disclosure may be integrated into one processing unit, or may be a separate physical existence of respective units, or two or more units are integrated into one unit. The above integrated unit may be implemented in a form of a hardware, or may be implemented in a form of a software functional unit.

The above descriptions are just specific implementations of the present disclosure, but the protection scope of the present disclosure is not limited thereto. Any alternation or replacement that can be easily conceived by those skilled in the art who are familiar with the technical field within the technical scope of the present disclosure shall be covered within the protection scope of the present disclosure. Therefore, the present disclosure shall be subject to the protection scope of the Claims.

The present application claims the priority of a Chinese patent application No. 201710336158.X filed on May 12, 2017. Herein, the content disclosed by the Chinese patent application is incorporated in full by reference as a part of the present disclosure.

What is claimed is:

1. A method for generating a notification, comprising:

receiving a subscription request, wherein the subscription request includes a resource offset, which indicates a hierarchy of one or more target resources, and different values of the resource offset indicate subscription to different combinations of the one or more target resources;

creating a first subscription resource according to the subscription request, the first subscription resource including a plurality of first event notification criteria and a second event notification criterion;

receiving multiple first events generated in accordance with the plurality of first event notification criteria;

determining whether the multiple first events satisfy the second event notification criterion; and generating a notification in a case where the multiple first events satisfy the second event notification criterion, wherein the notification indicates a second event, wherein the second event notification criterion indicates a relationship among the multiple first events, wherein, the multiple first events include events related to values of corresponding multiple sensed parameters; and wherein, the relationship among the multiple first events indicates a relationship between a predetermined threshold and a result obtained by performing an arithmetic operation on the values of the multiple sensed parameters, and when the result satisfies a condition related to the predetermined threshold, it is determined that the multiple first events satisfy the second event notification criterion.

2. The method according to claim 1, before receiving multiple first events generated in accordance with the plurality of first event notification criteria, further comprising:
creating at least one second subscription resource in accordance with the plurality of first event notification criteria.

3. The method according to claim 2, wherein the at least one second subscription resource belongs to one or more target resources.

4. The method according to claim 2, further comprising:
creating three or more levels of subscription resources in accordance with multiple levels of event notification criteria.

5. The method according to claim 1, wherein the subscription request includes at least one of the plurality of first event notification criteria and the second event notification criterion.

6. The method according to claim 5, wherein the subscription request further includes a list of target resources.

7. The method according to claim 6, wherein the subscription request further comprises a time window type and a time window size.

8. The method according to claim 1, wherein the generated multiple first events are further judged and analyzed in accordance with the second event notification criterion.

9. An apparatus for generating a notification, comprising:
a creating unit, configured to create a first subscription resource according to a subscription request, the first subscription resource including a plurality of first event notification criteria and a second event notification criterion, wherein the subscription request includes a resource offset, which indicates a hierarchy of one or more target resources, and different values of the resource offset indicate subscription to different combinations of the one or more target resources;

a receiving unit, configured to receive the subscription request and multiple first events generated in accordance with the plurality of first event notification criteria;

a determining unit, configured to determine whether the multiple first events satisfy the second event notification criterion; and a generating unit, configured to generate a notification in a case where the multiple first events satisfy the second event notification criterion, wherein the notification indicates a second event, wherein the second event notification criterion indicates a relationship among the multiple first events, wherein, the multiple first events include events related to values of corresponding multiple sensed parameters; and wherein, the relationship among the multiple first events indicates a relationship between a predetermined threshold and a result obtained by performing an arithmetic operation on the values of the multiple sensed parameters, and when the result satisfies a condition related to the predetermined threshold, it is determined that the multiple first events satisfy the second event notification criterion.

10. A method for subscribing to a notification, comprising;
transmitting a subscription request, wherein the subscription request includes a resource offset, which indicates a hierarchy of one or more target resources, and different values of the resource offset indicate subscription to different combinations of the one or more target resources; and receiving a notification in a case where multiple first events satisfy a second event notification criterion, wherein the notification indicates a second event, wherein the multiple first events are generated in accordance with a plurality of first event notification criteria, wherein the second event notification criterion indicates a relationship among the multiple first events, wherein, the multiple first events include events related to values of corresponding multiple sensed parameters; and wherein, the relationship among the multiple first events indicates a relationship between a predetermined threshold and a result obtained by performing an arithmetic operation on the values of the multiple sensed parameters, and when the result satisfies a condition related to the predetermined threshold, it is determined that the multiple first events satisfy the second event notification criterion.

11. The method according to claim 10, wherein the multiple first events belong to one or more target resources.

12. The method according to claim 10, wherein the subscription request includes at least one of the plurality of first event notification criteria and the second event notification criterion.

13. The method according to claim 12, wherein the subscription request further includes a list of target resources.

14. The method according to claim 13, wherein the subscription request further comprises a time window type and a time window size.

15. The method according to claim 10, wherein the generated multiple first events are further judged and analyzed in accordance with the second event notification criterion.

16. The method according to claim 10, wherein the subscription request comprises three levels or more levels of event notification criteria.

\* \* \* \* \*